United States Patent [19]

Souchi et al.

[11] Patent Number: 4,586,253
[45] Date of Patent: May 6, 1986

[54] APPARATUS FOR CONVEYING ELONGATED OBJECTS

[75] Inventors: Toshiyuki Souchi; Hisanori Fujiyama, both of Inazawa; Mitsuo Hagi, Ichinomiya, all of Japan

[73] Assignee: Toyoda Gosei Co., Ltd., Ichinomiya, Japan

[21] Appl. No.: 713,587

[22] Filed: Mar. 19, 1985

Related U.S. Application Data

[62] Division of Ser. No. 480,275, Mar. 30, 1983, abandoned.

[30] Foreign Application Priority Data

Apr. 1, 1982 [JP] Japan .................................. 57-54474

[51] Int. Cl.⁴ ............................................. B23P 19/00
[52] U.S. Cl. ...................................... 29/796; 29/237; 29/517; 198/774; 414/748
[58] Field of Search ............... 198/775, 777, 597, 456, 198/774, 413, 414, 415; 414/748; 29/237, 796, 516, 517

[56] References Cited

U.S. PATENT DOCUMENTS

| | | | |
|---|---|---|---|
| 1,441,042 | 3/1921 | Thackray | 198/774 |
| 1,451,381 | 4/1923 | Tunnell | 29/237 |
| 2,871,734 | 2/1959 | Fuchs, Jr. et al. | 29/237 |
| 2,893,348 | 7/1959 | Pearson | 414/748 |
| 3,066,506 | 12/1962 | Dichter | 414/748 |
| 3,606,661 | 9/1971 | Schoepe et al. | 29/796 X |
| 3,774,282 | 11/1973 | Hooper | 29/796 |
| 4,383,604 | 5/1983 | Grandemange | 198/775 |
| 4,397,174 | 8/1983 | Jungesjo | 198/774 |

FOREIGN PATENT DOCUMENTS 2153974  5/1973  Fed. Rep. of Germany ........ 29/237

Primary Examiner—Charlie T. Moon
Attorney, Agent, or Firm—Cushman, Darby & Cushman

[57] ABSTRACT

A small, structurally simple and operationally reliable apparatus for conveying a plurality of juxtaposed elongated objects transversely to a prescribed position, and moving them longitudinally one by one includes at least two pairs of vertically disposed plate members, those pairs being so spaced apart from each other as to support both ends of the objects thereon. The plate members in each of those pairs being placed one upon the other, and alternately vertically movable for conveying the objects transversely. Each of the plate members has a corrugated upper edge defined by a plurality of alternately occurring crests and roots. The crests on the upper edge of one of the plate members in each pair are in staggered relation to those on the other plate member by a distance which is equal to a half of the pitch between the crests. The apparatus further includes a member provided between those pairs of plate members for receiving each of the elongated objects and moving it longitudinally. The receiving member is situated above the upper edges of the plate members in their lowered position, and at a level of height which is equal to the level of the roots of any of the plate members in its raised position. The apparatus is, for example, suitable for use in combination with caulking devices for brake hoses.

1 Claim, 5 Drawing Figures

APPARATUS FOR CONVEYING ELONGATED OBJECTS

This is a division of application Ser. No. 480,275, filed Mar. 30, 1983, now abandoned.

BACKGROUND OF THE INVENTION

1. Field of the Invention

This invention relates to an apparatus for conveying a plurality of juxtaposed elongated objects transversely to a particular position, and moving them longitudinally one by one so that a particular kind of work may be done on each object. The apparatus is particularly useful in a process in which metal fittings are secured to brake hoses.

2. Description of the Prior Art

The prior art and the present invention will hereinafter be described with reference to an apparatus for handling brake hoses merely by way of example. A brake hose usually carries at each end thereof a metal fitting having a sleeve portion caulked thereon. Typically the sleeve portion is externally of circular transverse cross-section, i.e., is externally cylindrically curved, and is juxtaposed axially inwardly of a radially outwardly projecting flange, e.g., one configured to receive a tightening tool, e.g., by being of hexagonal nut-like profile. In order to carry out the caulking operation automatically, it is necessary to convey a plurality of juxtaposed brake hoses transversely (i.e., in a direction perpendicular to the longitudinal hose axis) to a particular position in which each hose is moved longitudinally in one direction so that the sleeves on both ends thereof may be caulked successively. The transportation of the hoses to that particular position is usually carried out by, for example, a chain conveyor, or a transfer unit having a plurality of work chucks. These conventional apparatuses are, however, very large, or unreliable in operation due to, for example, the elongation of the chains with the lapse of time.

SUMMARY OF THE INVENTION

It is an object of this invention to provide a small, structurally simple and reliable apparatus for conveying a plurality of juxtaposed elongated objects transversely to a particular position, and then, moving them longitudinally one by one.

It is another object of this invention to provide an apparatus which ensures the reliable transverse transportation of elongated objects without developing any difference in the pitch between every two adjoining objects, which is an unavoidable defect in a chain conveyor due to the elongation of the chains, and which facilitates the longitudinal transfer of an elongated object in a position raised above the plane of the transverse transportation, and is, therefore, suitable for the transfer of an elongated object having a radial projection, for example, a brake hose having at each end a radially outwardly extending flange on a metal fitting during the caulking of the metal fitting.

It is still another object of this invention to provide an apparatus for conveying elongated objects which does not require any work chuck disposed above the plane of their transportation, so that the work, i.e., the elongated objects may be easily seen.

These objects are attained by an apparatus which comprises at least two pairs of vertically disposed plate members which are alternately vertically movable for conveying a plurality of juxtaposed elongated objects transversely, and a member provided between those pairs of plate members for receiving one of those objects thereon to transfer it longitudinally, the plate members in each pair being slidably placed one upon the other, each plate member having a corrugated upper edge defined by a plurality of crests and a plurality of roots, the crests on one of each pair of plate members being in staggered relation to those on the other plate member by a distance which is equal to a half of the pitch between the crests, the receiving member being disposed at a level of height which is higher than any of the plate members in its lower position, and which is equal to the level of the roots of any of the plate members in its upper position.

DESCRIPTION OF THE PREFERRED EMBODIMENT

Figure 1:
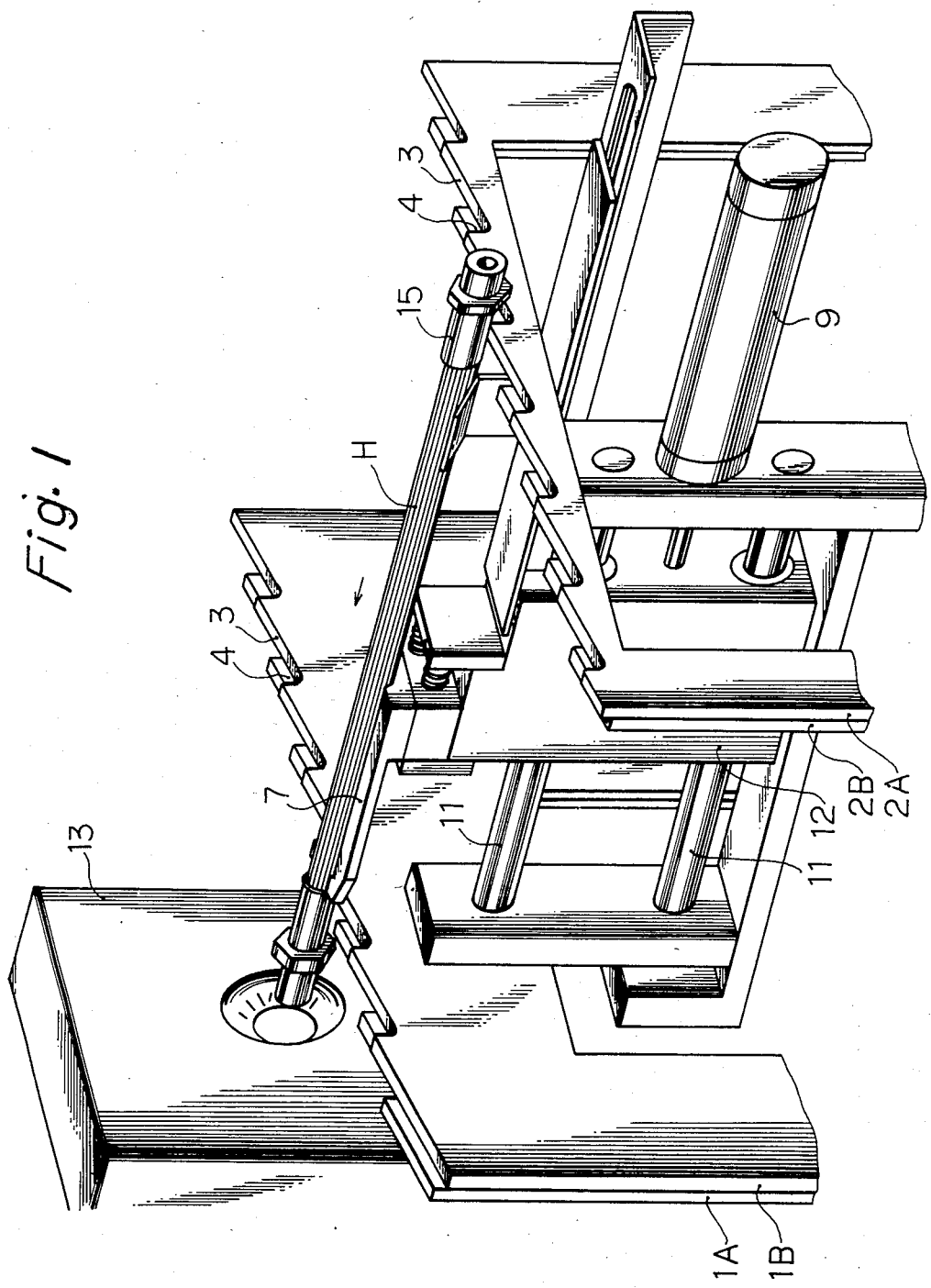
FIG. 1 is a perspective view of an apparatus embodying this invention, and used for conveying the brake hoses on which the metal fittings are to be caulked.

Referring to FIG. 1 of the drawings, an apparatus embodying this invention comprises two pairs of vertically disposed plate members 1A and 1B, and 2A and 2B which are alternately vertically movable for conveying a plurality of juxtaposed brake hoses H transversely, i.e., in a direction perpendicular to the longitudinal hose axis. Each plate member has a corrugated upper edge defined by a plurality of crests and a plurality of roots. The crests on the upper edge of the plate member 1A are in staggered relation to those on the plate member 1B by a distance which is equal to a half of the pitch between the crests. The same relationship exists between the plate members 2A and 2B. The crests and roots on each plate member define a plurality of alternately occurring inclined flanks 3 for moving each hose forward, and substantially vertical flanks 4 which serve as a stop therefor.

Figure 2A:
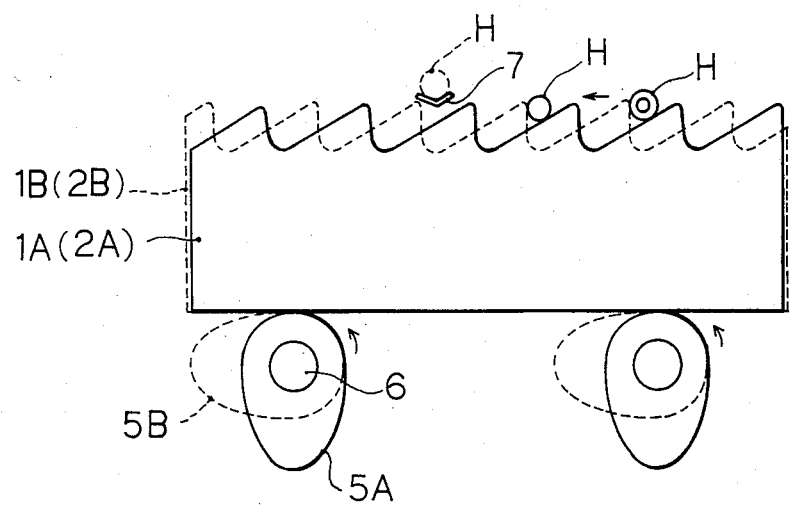
FIGS. 2A to 2C are fragmentary side elevational views of the apparatus illustrating the sequence of its operation.
Figure 2B:
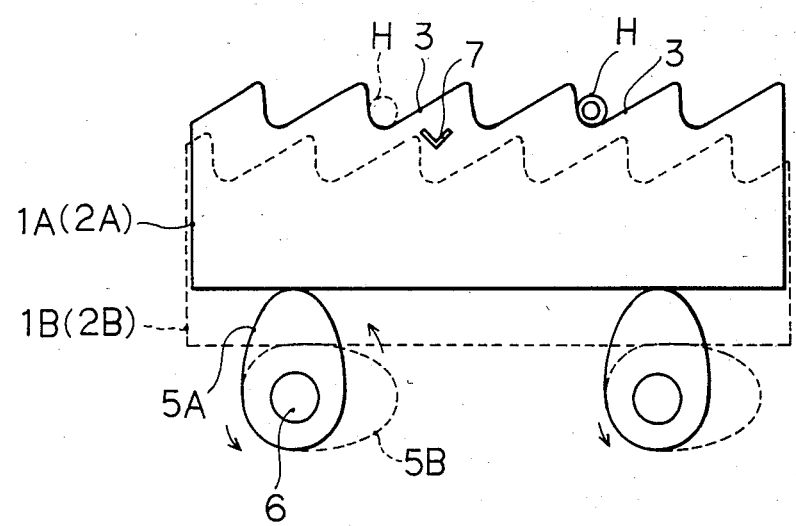
Figure 2C:
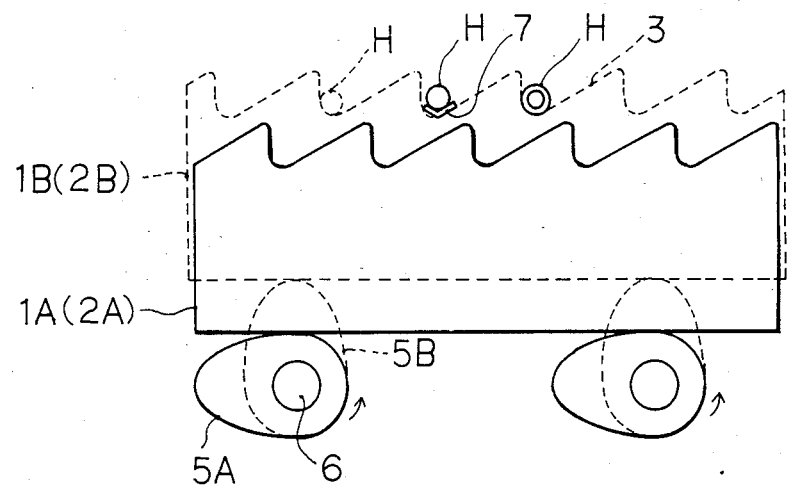

Two pairs of egg-shaped cam plates 5A and 5B are provided for each pair of plate members to move them vertically in an alternate fashion as shown in FIGS. 2A to 2C. Both of the plate members in each pair are in their original or lower position in FIG. 2A, and one of them is in its upper position in FIG. 2B, while the other is in its upper position in FIG. 2C. Each pair of cam plates 5A and 5B are rotated together by a rotary shaft 6 connected to an electric motor or other prime mover not shown.

A member 7 is provided between the two pairs of plate members for receiving a hose H thereon. The receiving member 7 is situated above the plate members 1A to 2B in their lower position as shown in FIG. 2A, and at a level of height which is equal to the level of the roots on the upper edge of any plate member in its upper position as shown in FIG. 2B or 2C. The receiving member 7 is carried on a slidable member 12 which is movable by an air cylinder 9 along a pair of guide shafts 11 in a direction which is perpendicular to the plate members 1A to 2B, as shown by an arrow in FIG.

1. A caulking device 13 is disposed outwardly of the plate members 1A and 1B.

Each brake hose H has one end resting on the upper edges of the plate members 1A and 1B, while the other end thereof rests on the upper edges of the plate members 2A and 2B. Each rotation of the cam plates 5A and 5B gives rise to the transverse movement of the hose H by a distance which is equal to the pitch between every two adjoining crests on the upper edges of the plate members. The hose H which is shown by a double circle in FIG. 2A is moved from its position in FIG. 2A to its position in FIG. 2B by rolling or sliding down on inclined flanks 3 upon upward movement of the plate members 1A and 2A, and from its position in FIG. 2B to its position in FIG. 2C by rolling or sliding down on inclined flanks 3 upon downward movement of the plate members 1A and 2A and upward movement of the plate members 1B and 2B, and arrives at its position shown by a single circle in FIG. 2A upon return of all the plate members 1A to 2B to their lower position. The hose H, which is transversely conveyed as hereinabove described, eventually arrives at its position shown by a single circle in FIG. 2C, and upon downward movement of the plate members 1B and 2B, its rests on the receiving member 7 as shown by a circle in a broken line in FIG. 2A. Then, the air cylinder 9 is actuated to move the receiving member 7 toward the caulking device 13. As the hose H is in a position raised above the upper edges of the plate members 1A to 2B, is easily movable toward the caulking device 13 without any interference of its metal fitting 15 with the plate members 2A and 2B to enable the caulking of the metal fitting on the other end of the hose. The rotation of the cam plates 5A and 5B is discontinued throughout the caulking operation to discontinue the vertical movement of the plate members 1A to 2B. Upon completion of the caulking operation, the air cylinder 9 is actuated again to retract the receiving member 7 to its original position, and the cam plates 5A and 5B are rotated again. The plate members 1A and 2A rise, and lift the hose H from the receiving member 7, whereupon the hose H rolls or slides down on inclines flanks 3 into its position shown by a circle in a broken line in FIG. 2B. The sequence of operation is repeated for any further transportation of the hose H.

Figure 3:
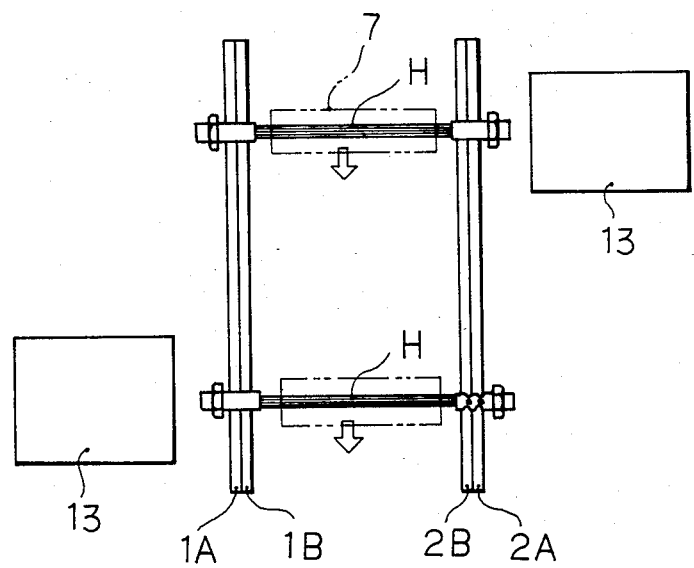
FIG. 3 is a schematic top plan view showing the apparatus of this invention in conjunction with caulking devices for brake hoses.

For the mere sake of simplicity of illustration, FIG. 1 shows an arrangement in which the caulking operation is carried out on only one end of the hose. In practice, however, it is necessary to caulk the metal fittings on both ends of the hose. A suitable arrangement therefor is shown by way of example in FIG. 3, and includes a pair of receiving members 7 and a pair of caulking devices 13 disposed each adjacent to one of the receiving members 7 which are appropriately spaced apart from each other.

Although the embodiment hereinabove described includes the cam plates, rotary shafts and prime movers for moving the plate members vertically, it is equally possible to employ cylinders or other devices which move the plate members directly.

What is claimed is:

1. Apparatus for caulking metal fittings onto both ends of each of a transversely arranged succession of lengths of hose, each having a metal fitting received thereon so that an externally cylindrical sleeve of the fitting is juxtaposed axially inwardly of a radially outwardly projecting circumferential flange of the fitting, said apparatus comprising:

at least two pairs of vertically disposed plate members, said pairs being so spaced apart from each other as to support the cylindrical sleeves of the metal fittings at both ends of said lengths of hose thereon, said plate members in each of said pairs being placed one upon the other, and alternately vertically movable for conveying said lengths of hose with fittings assembled thereon transversely, each of said plate members having a corrugated upper edge defined by a plurality of alternately occurring crests and roots, said crests on said upper edge of one of said plate members in each of said pairs being in staggered relation to said crests on the other plate member by a distance which is equal to a half of the pitch between said crests;

said crests and roots defining a plurality of alternately occurring inclined flanks and substantially vertical flanks, said inclined flanks enabling said lengths of hose with fittings assembled thereon to move down into said roots, said vertical flanks serving as a stop for said lengths of hose with fittings assembled thereon;

at a first caulking station disposed intermediate the longitudinal extent of said pairs of plate members, there being provided transversely to one outer side of said pairs of plate members a first caulking device constructed and arranged for caulking the sleeves of a succession of said metal fittings assembled on a succession of respective one ends of respective ones of said lengths of hose, said first caulking device being directed transversely inwardly of said pairs of plate members;

a first receiving member provided between said pairs of plate members at said first caulking station for successively receiving each of said lengths of hose with fittings assembled thereon and moving it longitudinally, temporarily, by an amount sufficient to place a said fitting assembled on one end of a respective said length of hose received on sad receiving member within operational reach of said first caulking device for caulking of the respective sleeve of the respective fitting into said one end of said respective length of hose, said first receiving member being situated above said upper edges of said plate members in their lowered position, and at a level of height which is equal to the level of said roots of any of said plate members in its raised position;

at a second caulking station disposed intermediate the longitudinal extent of said pairs of plate members further along said longitudinal extent than said first caulking station, there being provided transversely to the opposite outer side of said pairs of plate members from said one other side a second caulking device constructed and arranged for caulking the sleeves of a succession of said metal fittings assembled on a succession of respective other ends of respective ones of said lengths of hose, said second caulking device being directed transversely inwardly of said pairs of plate members;

A second receiving member provided between said pairs of plate members at said second caulking station for successively receiving each of said lengths of hose with fittings assembled thereon and moving it longitudinally, temporarily, by an amount sufficient to place a said fitting assembled on a said other end of a respective said length of hose received on said receiving member within operational reach of said second caulking device for caulking of the respective sleeve of the respective fitting onto said other end of said respective length of hose, said second receiving member being situated above said upper edges of said plate members in their lowered position, and at a level of height which is equal to the level of said roots of any of said plate members in its raised position; and means for reciprocatingly moving each of said pairs of plate members vertically accordingly to a cyclic pattern in which at one time at least one of said pairs is fully raised when at least another of said pairs is still lowered, at another time said at least one pair is fully lowered when said at least one other pair is fully raised, and at a further time all of said pairs are fully lowered.

* * * * *